(12) United States Patent
Yan (10) Patent No.: US 9,910,870 B2
(45) Date of Patent: Mar. 6, 2018

(54) SYSTEM AND METHOD FOR CREATING DATA MODELS FROM COMPLEX RAW LOG FILES

(71) Applicant: Nancy Yan, Cupertino, CA (US)

(72) Inventor: Nancy Yan, Cupertino, CA (US)

(73) Assignee: SAP SE, Walldorf (DE)

( * ) Notice: Subject to any disclaimer, the term of this patent is extended or adjusted under 35 U.S.C. 154(b) by 586 days.

(21) Appl. No.: 14/167,301

(22) Filed: Jan. 29, 2014

(65) Prior Publication Data

US 2015/0213066 A1 Jul. 30, 2015

(51) Int. Cl.
*G06F 17/30* (2006.01)

(52) U.S. Cl.
CPC .............................. *G06F 17/30294* (2013.01)

(58) Field of Classification Search
CPC ................................................. G06F 17/30294
USPC ......................................................... 707/802
See application file for complete search history.

(56) References Cited

U.S. PATENT DOCUMENTS

| | | | | |
|---|---|---|---|---|
| 8,682,925 B1* | 3/2014 | Marquardt | ........ | G06F 17/30477 707/722 |
| 9,507,848 B1* | 11/2016 | Li | ...................... | G06F 17/30613 |
| 2003/0004971 A1* | 1/2003 | Gong | ................... | G06Q 10/087 |
| 2006/0271885 A1* | 11/2006 | Pittendrigh | ........ | G06F 17/30554 715/856 |
| 2007/0250188 A1* | 10/2007 | Kuhner | .............. | G05B 19/0426 700/83 |
| 2013/0311468 A1* | 11/2013 | Hjelm | .................... | G06Q 10/06 707/737 |
| 2014/0222843 A1* | 8/2014 | Sareen | ................ | H04L 67/1097 707/755 |
| 2014/0325149 A1* | 10/2014 | Misra | .................... | G06F 3/0619 711/114 |

* cited by examiner

*Primary Examiner* — Joshua Bullock
(74) *Attorney, Agent, or Firm* — Buckley, Maschoff & Talwalkar LLC (57) ABSTRACT

According to some embodiments, a method and an apparatus of creating a data model from a log file comprises receiving a log file and determining metadata based on the received log file. A proposed data model based on the determined metadata is transmitted and the data model is saved to a database.

20 Claims, 6 Drawing Sheets

| Source | Size | Type | Owner |
|---|---|---|---|
| Ariba_logs | 0 | Directory | hadoop |
| DG_support.csv | 1077160 | File | hadoop |
| http_logfile_g12.txt | 684914 | file | hadoop |

FIG. 4A

| Line Entry Seperator: ☐ New Line  ☐ Time Stamp  ☐ Carriage Return |
|---|
| Log Entry: |
| 22.785 [GC [PsYoungFen 30720K->3750K(35840K), 0.4533 secs) |
| Times: user=0.02 sys-0.00 real=0.55 secs) |
| 22.785 [GC [PsYoungFen 38724K->3990K(35840K), 0.3672 secs) |
| Times: user=0.02 sys-0.00 real=0.45 secs) |
| 22.785 [GC [PsYoungFen 40634K->4550K(35840K), 0.2398 secs) |
| Times: user=0.02 sys-0.00 real=0.35 secs) |
| 22.785 [GC [PsYoungFen 46720K->7750K(35840K), 0.1515 secs) |
| Times: user=0.02 sys-0.00 real=0.25 secs) |

FIG. 4B

| Master | Line Field Delimiter<br>☐ Space  ☐ Comma  ☐ Other |
|---|---|
| ☐ | Sample Log Entry |
| ☐ | 22.785 [GC [PsYoungFen 30720K->3750K(35840K), 0.4533 secs)<br>Times: user=0.02 sys-0.00 real=0.55 secs) |
| ☐ | 22.785 [GC [PsYoungFen 38724K->3990K(35840K), 0.3672 secs)<br>Times: user=0.02 sys-0.00 real=0.45 secs) |
| ☐ | 22.785 [GC [PsYoungFen 40634K->4550K(35840K), 0.2398 secs)<br>Times: user=0.02 sys-0.00 real=0.35 secs) |
| ☐ | 22.785 [GC [PsYoungFen 46720K->7750K(35840K), 0.1515 secs)<br>Times: user=0.02 sys-0.00 real=0.25 secs) |

FIG. 4C

| Log Field Name 410 | Include in Database 412 | Log Field SampleData 414 | Content Type 416 | Regular Expression 418 | Country 420 | Region 422 | Latitude 424 | Longitude 426 |
|---|---|---|---|---|---|---|---|---|
| Field_1 | ☐ | Tue | | | ☐ | | | |
| Week_0 | ☐ | Tue | Week | ((?:Monday|Tuesday|Wednesday|... | | ☐ | ☐ | ☐ |
| Month_1 | ☐ | Aug | Month | ((?:January|February|March|... | | ☐ | ☐ | ☐ |
| Day_1 | | 13 | Day | ((?:D-2|FD1?XD... | | ☐ | ☐ | ☐ |
| Day_2 | | 27 | Day | ((?:?(D1?(D3)... | | ☐ | ☐ | ☐ |

FIG. 4D

| Model Name | Model_1 |
|---|---|
| Model Description | Source Model for Ariba Logs |
| Model Definition | XXXXXXXXXXXXXXXXXXXXXX |

SYSTEM AND METHOD FOR CREATING DATA MODELS FROM COMPLEX RAW LOG FILES

BACKGROUND

A log file, or simply a log, is a file that records events which have occurred during execution of a computer system or during the execution of a file. The purpose of a log file is to provide data which may be used to understand activity that occurred during the execution of the computer system and to diagnose problems with applications or an operating system running on the computer system. Logs may comprise machine-generated data that are generated by internet protocol ("IP") enabled end-points or devices like web logs, network events, call data records, and RFID information.

Most log files comprise raw unstructured data. Raw unstructured data refers to information that does not have a predefined data model and has not been analyzed. Raw unstructured data, such as application logs and web logs, may be text-heavy but may also contain data like dates, numbers, facts and master data. However, since log files comprise unstructured data, it is challenging to obtain useful information that is embedded in large log files comprising unstructured data.

DETAILED DESCRIPTION

The present embodiments relate to a method, apparatus and system to create data models from complex unstructured or semi-structured log files, and to define a generic system and method that automatically learns and proposes data modeling structures, in either flat or hierarchical representation, and regular expression patterns based on a single log file or a series of similar log files.

Obtaining valuable information that is embedded in unstructured logs is a challenge. However, creating a data model from log files can help users to extract valuable information into a structured dataset format. To model raw unstructured log files, it may be useful to retrieve information and/or model information within a raw unstructured log file because raw unstructured logs, like SAP HANA server logs, may contain metadata descriptions, nested sections and hierarchies.

Figure 1:
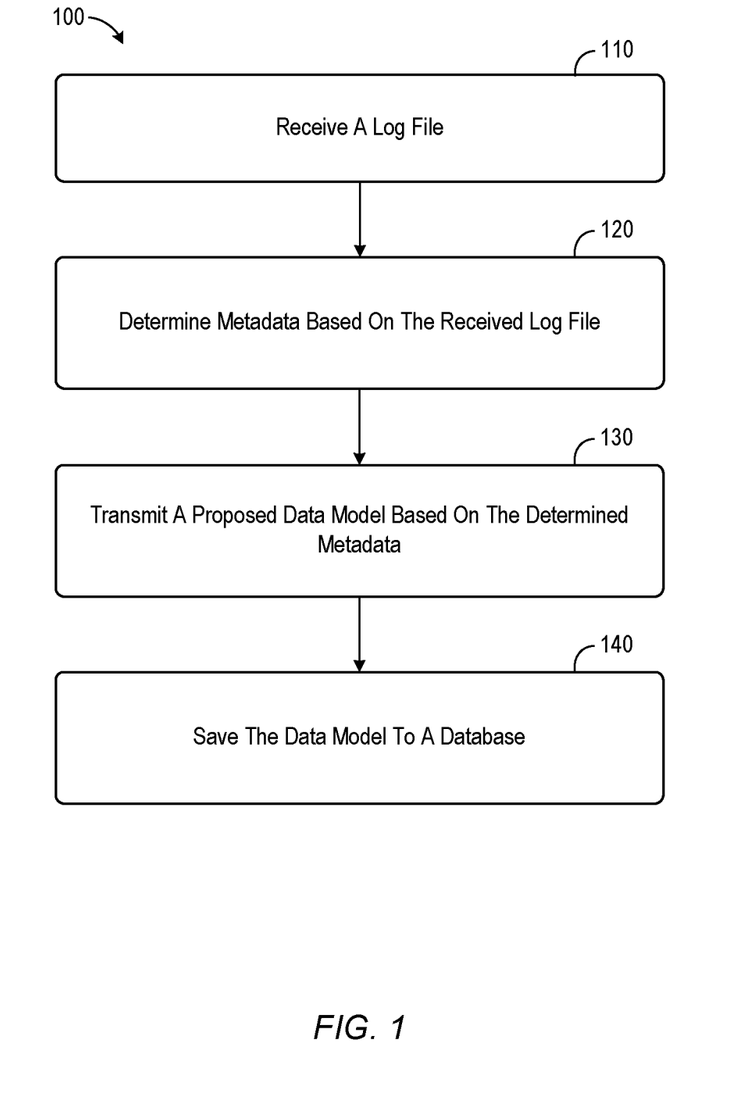
FIG. 1 illustrates a method according to some embodiments.

Turning now in detail to the drawings, FIG. 1 is a flow chart that illustrates a method 100 that may be performed according to some embodiments. The flow chart in FIG. 1 does not imply a fixed order to the steps, and embodiments of the present invention can be practiced in any order that is practicable. Moreover, the methods may be performed by any of the devices described herein. The method shown in FIG. 1 may be performed, for example, by the system 200 of FIG. 2 and the apparatus 500 FIG. 5. The method 100 may be embodied on a non-transitory computer-readable medium.

At 110 of FIG. 1, a log file is received. The log file may comprise a raw unstructured log file. The log file may be associated with a file extension such as, but not limited to, trace, text, or log. Log files may be streamed in either real time or log files may be received at a scheduled time. When a log file arrives at a system, such as system 200 of FIG. 2, the log file may be scanned and clustered based on a naming convention and a file extension which are each associated with the received log file. In a case that a same type of log file has already been modeled, the existing model may be displayed to a user when the user attempts to model the received log file. If the type of log file associated with the received log file does not exist, a new modeling process may be presented to the user. The new modeling process may be associated with the following.

At 120 of FIG. 1, a plurality of metadata associated with a log file is determined. Determining a plurality of metadata associated with a log file may comprise (1) a determination of a log entry separator, such as, but not limited to, a new line, a time stamp, a carriage return, or a user defined indicator (e.g., a word or combination of characters). (2) a determination of one or more master log entries, (3) determining an indication of a field separator (e.g., a field delimiter) and (4) determining a configuration of fields associated with the log file (e.g., fields that will be associated with a data model). The determined plurality of metadata may be presented to a user via a user device. While a system determines and presents the metadata to the user, the user may adjust or modify the metadata based on the user's knowledge of the application associated with the log file. Therefore, in some embodiments, a system may receive a modification of the metadata in response to presenting the determined plurality of metadata to the user.

For illustrative purposes, and to aid in understanding features of the specification, an example will be introduced. This example is not intended to limit the scope of the claims. Now referring to FIG. 2, an embodiment of a system 200 is illustrated. System 200 includes a user device 230 comprising a modeling user interface ("UI") that is in communication with a backend processor of a log analyzer system 250. In some embodiments, the log analyzer system 250 may receive a log file 240 from another system (e.g., a database, a file system, an application, or a machine device, etc.) or any IP enabled device.

Figure 2:
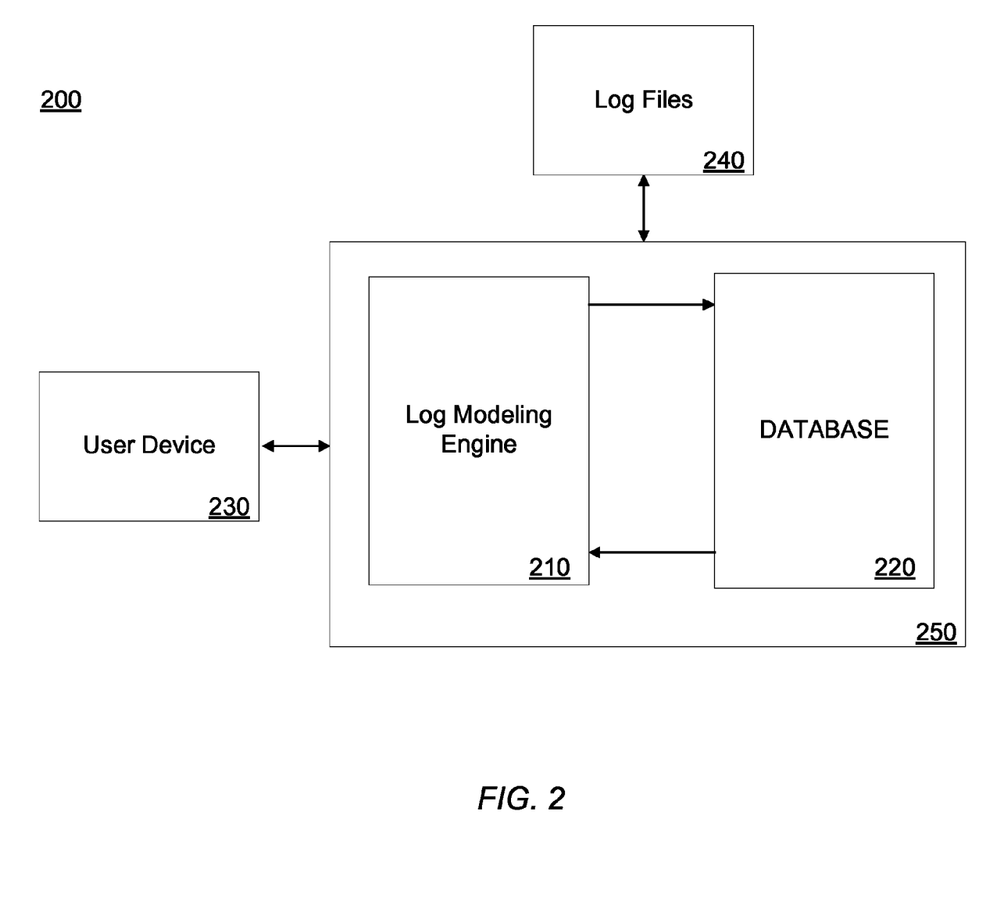
FIG. 2 illustrates a system according to some embodiments.

The log analyzer system 250 may comprise a log modeling engine 210 that is in communication with a database 220. The log modeling engine 210 may process the received unstructured log file based on a plurality of data received from the user device 230. In some embodiments, the plurality of metadata may be based on a user's interaction with a modeling UI.

At 130, a data model based on the determined metadata is defined. The determination may be made by a processor such as the processor described with respect to FIG. 5. The determined data model may be proposed to a user by transmitting the proposed data model to the user for review and/or adjustment. Therefore, in some embodiments, a system may receive a modification of the data model in response to presenting the determined data model to the user.

Continuing with the above example, the log modeling engine 210 may create a data model associated with the log file via a processor. The data model may comprise 1) a plurality of fields that relate to determined data types 2) a plurality of fields that relate to field names, 3) a plurality of fields and their associated regular expressions and transformations that are contained within the unstructured log file, 4) a set of data processing indicators for each field to indicate if a field contains information that is more important than other information and thus should be extracted into a structured dataset and 5) a plurality of configuration parameters for each field to indicate field relationship and content types.

At 140, the data model is saved to a database. Continuing with the above example, once the data model is created, the data model may be stored (e.g., saved) in the database 220. The data model presentation may be XML, JSON or modeling markup language. The data model may be reusable with other log files that comprise a same structure and format. In some embodiments, the data model may be used for processing mass unstructured log files and obtaining defined valuable fields in structured format.

Figure 3:
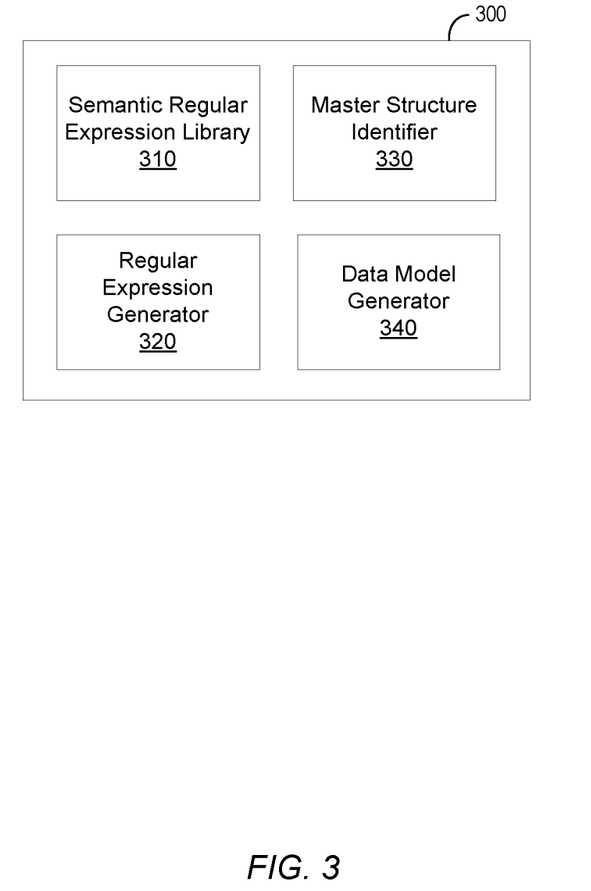
FIG. 3 illustrates a log modeling engine according to some embodiments.

Now referring to FIG. 3, an embodiment of a log modeling engine 300 is illustrated. The log modeling engine 300 may comprise a semantic regular expression library 310 that contains maps of predefined regular expressions and semantic representations such as Time (MMDDYYYY), IP address, HTTP method, etc. The regular expression library 310 may store regular expressions and the data fields that they relate to. Furthermore, when new regular expressions (and their associated data fields) are determined, this information may be stored in the regular expression library 310 for reuse with future log files.

The log modeling engine 300 further comprises a regular expression generator 320. When raw unstructured logs are parsed line by line, the regular expression generator 330 generates regular expressions for each line and obtains semantic meanings for each identified attribute by looking up each regular expression in the regular expression library 310. If regular expression is distinct, it is put into a separate collection in a system memory as a distinct regular expression. A master structure identifier 330 may serve as a comparator to examine distinct regular expressions based on metadata of each field and may identify a master structure based on matching a pattern and relationships between log entries as well as field positions within a log file. A data model generator 340 may generate a data model in an Extensible Markup Language ("XML"), JavaScript Object Notation ("JSON") or Predictive Model Markup Language ("PMML") format. The data model generator 340 may capture a data source, transformation, and target destination, and other information that may be required for data processing and saving a data model.

The log modeling engine 300 may be used to determine distinct regular expressions associated with a raw unstructured log file and once these regular expressions are learned and stored in a regular expression library 310, a tree table may be used to present a data model structure to a user. For each distinct log structure, relevant log entries are grouped and displayed as a reference which is illustrated in FIG. 4B. Once the log structure is displayed, a user (e.g., a data scientist) may refine the final data model based on distinct patterns. In the model attributes configuration portion, each field in the distinct patterns can be configured such as Log Field Name, included in Dataset, Log Field Sample Data, Content Type, Regular Expressions, as well as enhanced fields such as Country, Region, Latitude, Longitude, Month, Year.

In practice, the log modeling engine 300 may receive data from a modeling user interface that functions as a wizard to guide a user through a modeling process by facilitating a user choosing logs as a data source, defining a log structure tree, selecting a master log entry, configuring log fields, and saving a data model.

Since a log structure is complex, a visualization of a log structure or hierarchy is important in determining a data model associated with the log. Now referring to FIGS. 4A, 4B, 4C, 4D, and 4E an embodiment of a modeling user interface is illustrated. FIGS. 4A, 4B, 4C, 4D, and 4E relate to a user interface that guides a user through a process of determining a master model structure and selections made by the user may be transmitted to the log modeling engine 300 for processing. The user's selections within the modeling user interface may determine how the log modeling engine 300 processes and models a log file comprising raw unstructured data.

Figure 4A:
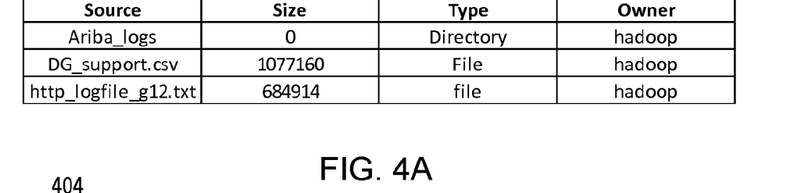
FIG. 4A illustrates a portion of a user interface according to some embodiments.
Figure 4B:
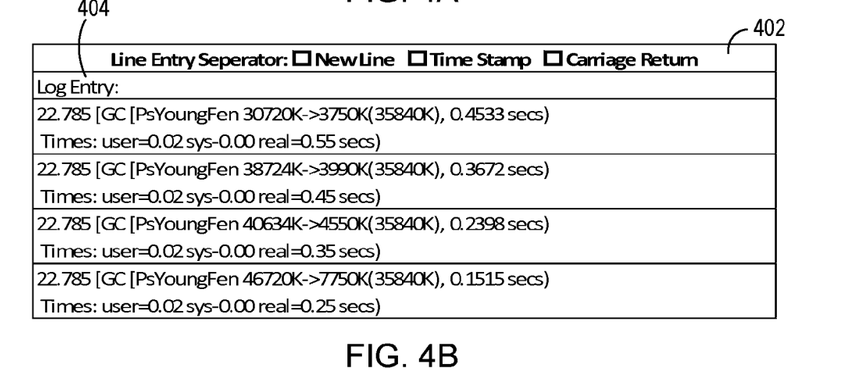
FIG. 4B illustrates a portion of a user interface according to some embodiments.

Referring to FIG. 4A, a user may be presented with a plurality of log files located within a database, directory, or IP enabled device. As illustrated in FIG. 4A, a user may be presented with a listing of log files (e.g., DG_support.csv and http_logfile_g12.txt) and associated information about each log file such as a size of the file and an owner of the file. The user may select a log file for processing. An indication of the selected log file is transmitted to the log modeling engine 300 for processing.

Next, and referring now to FIG. 4B, the modeling user interface may receive log entries 404 from the log modeling engine 300 and the modeling user interface may display the received log entries 404. A user may determine how entries (e.g., segments) within the log file are separated by selecting a line entry separator 402. For example, the log entries may be separated based on a new line, a time stamp, or a carriage return. Upon selection of a line entry separator, the line entity separator indication is transmitted to the log modeling engine 300. In response, the log modeling engine 300 may separate the log file into entries and transmit the separated entries to the modeling user interface.

Figure 4C:
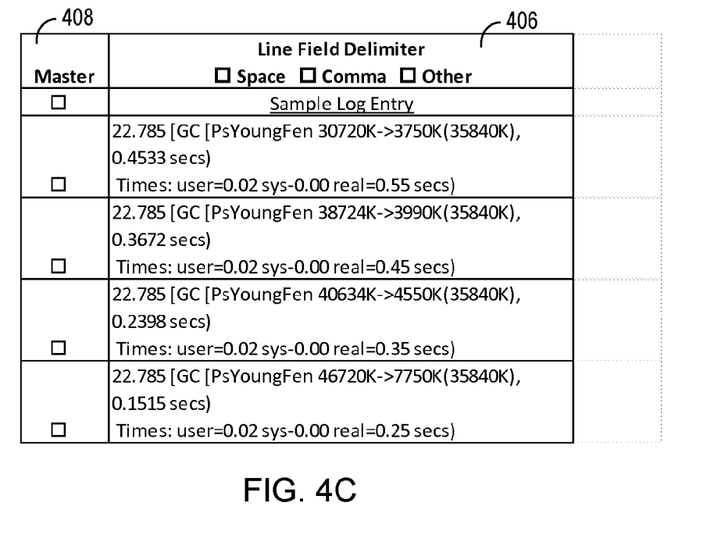
FIG. 4C illustrates a portion of a user interface according to some embodiments.
Figure 4D:
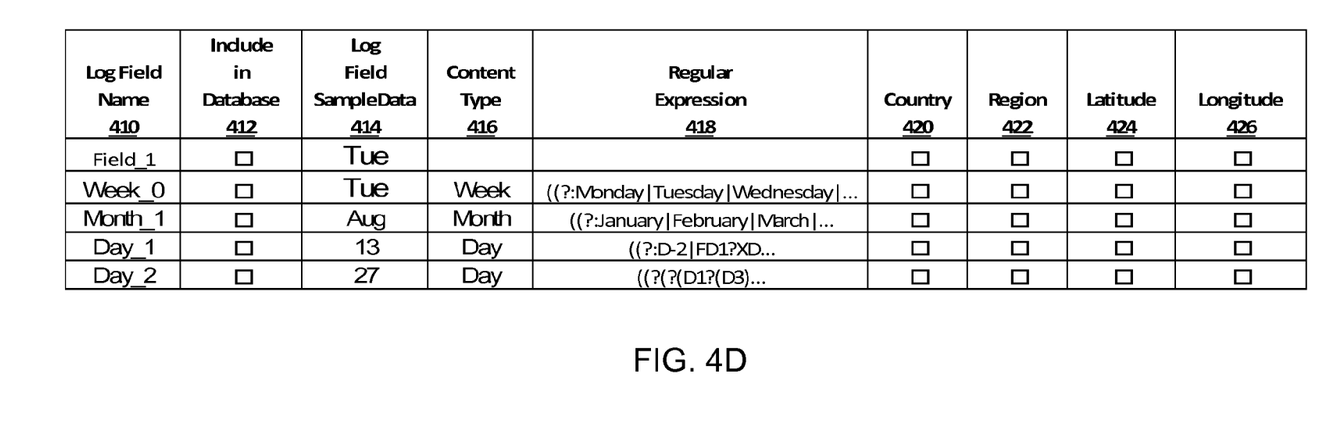
FIG. 4D illustrates a portion of a user interface according to some embodiments.

Now referring to FIG. 4C, the modeling user interface may display the separated entries from the log file. In this figure, a user may select a master log entry 408 that the data model will be based on. For example, the modeling user interface may display ten entries (or any available number) form a log file that comprise similar regular expressions and a user may determine which of the ten displayed entries should be used for determining a data model. The user may further select a line field delimiter 406 to determine how a selected entry of the log file will be delimited. For example, a user may select a space, a comma, a tab, a character, a phrase, or a user defined field separator. The indication of the master log entry and the line field delimiter may be passed to the log modeling engine 300. Based on this received information, the log modeling engine 300 may transmit a listing of determined fields and associated information for each determined field. The determination of fields may be based on determining regular expressions 418 that are contained within the master log entry. The determination may be made by the regular expression generator 320 and regular expressions may be determined by processing the master log entry to determine (1) patterns (e.g., character patterns, data, distinct values, and regular expressions), (2) a series of known characters (e.g., a group of American Standard Code for Information Interchange ("ASCII") characters), and/or other recognizable attributes. If a determined regular expression is known, information associated with the regular expression may be looked up in the regular expression library 310. The associated data of the master log entry, as illustrated in FIG. 4D, may comprise a log field name 410, log field sample data 414, and a content type which may comprise a type of data content in the field 416. If information about the determined regular expression is not found in the regular expression library 310 then a new entry may be made in the regular expression library 310 to store information about the newly determined regular expression.

As illustrated in FIG. 4D, the log modeling engine 300 may determine a field associated with a week, a field associated with a month, a first field associated with a day, a second field associated with a day, and an unknown field. Each field may comprise a plurality of configurable attributes.

As indicated by the log field name 410, a first discovered field related to a day is listed as day_1 and the second discovered field related to a day is listed as day_2. Each log field name is displayed with sample data 414 as well as a content type which may be used to define a model. For example, field Month_1 has a sample data of "Aug" and a content type of Month. Furthermore, the name and sample data may be configurable. In some embodiments, fields that are unknown to the log modeling engine 300 (e.g., fields associated with regular expressions that are not found in the regular expression library 310) may be presented as "field" and a user may be able to select a content type, and other attributes, associated with "field" from drop downs (or other types of selection tools) associated with content type 416 and the other attributes.

Figure 4E:
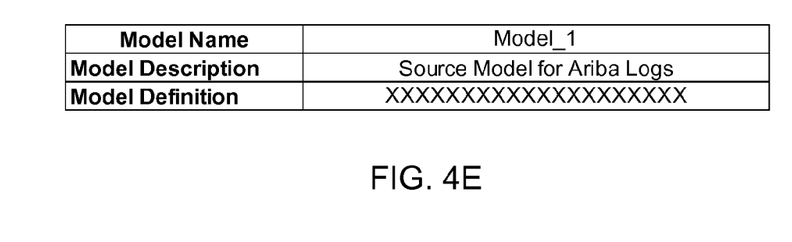
FIG. 4E illustrates a portion of a user interface according to some embodiments.

The modeling user interface further provides field 412 that allows a user to indicate if a particular field should be part of a data model. If a field 412 is selected, the associated data field may be included in the data model. The modeling user interface also provides fields, such as, but not limited to, country 420, region 422, latitude 424 and longitude 426 which may be enhancement that can be added to the data model. Once an indication of the fields to be used as part of the data model are transmitted to the log modeling engine 300, the log modeling engine 300 may create a data model, via a processor, in a language, such as, but not limited to JSON and submit the model to the user so that the user can save the data model and add a title and/or description as illustrated in FIG. 4E.

Figure 5:
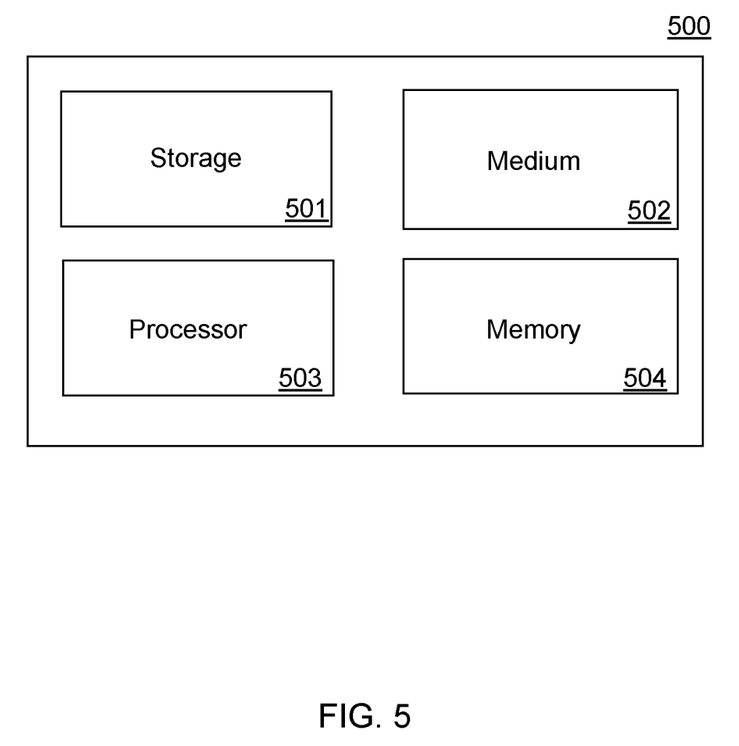
FIG. 5 illustrates an apparatus according to some embodiments.

Now referring to FIG. 5, an embodiment of an apparatus 500 is illustrated. In some embodiments, the apparatus 500 may be associated with a log modeling engine 300.

The apparatus 500 may comprise a storage device 501, a medium 502, a processor 503, and a memory 504. According to some embodiments, the apparatus 500 may further comprise a digital display port, such as a port adapted to be coupled to a digital computer monitor, television, portable display screen, or the like.

The medium 502 may comprise any computer-readable medium that may store processor-executable instructions to be executed by the processor 503. For example, the medium 502 may comprise a non-transitory tangible medium such as, but not limited to, a compact disk, a digital video disk, flash memory, optical storage, random access memory, read only memory, or magnetic media.

A program may be stored on the medium 502 in a compressed, uncompiled and/or encrypted format. The program may furthermore include other program elements, such as an operating system, a database management system, and/or device drivers used by the processor 503 to interface with peripheral devices.

The processor 503 may include or otherwise be associated with dedicated registers, stacks, queues, etc. that are used to execute program code and/or one or more of these elements may be shared there between. In some embodiments, the processor 503 may comprise an integrated circuit. In some embodiments, the processor 503 may comprise circuitry to perform a method such as, but not limited to, the method described with respect to FIG. 1.

The processor 503 communicates with the storage device 501. The storage device 501 may comprise any appropriate information storage device, including combinations of magnetic storage devices (e.g., a hard disk drive), optical storage devices, flash drives, and/or semiconductor memory devices. The storage device 501 stores a program for controlling the processor 503. The processor 503 performs instructions of the program, and thereby operates in accordance with any of the embodiments described herein.

The main memory 504 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 504 may comprise a plurality of memory modules.

As used herein, information may be "received" by or "transmitted" to, for example: (i) the apparatus 500 from another device; or (ii) a software application or module within the apparatus 500 from another software application, module, or any other source.

In some embodiments, the storage device 501 stores a database (e.g., including information associated with regular expressions). Note that the database described herein is only an example, and additional and/or different information may be stored therein. Moreover, various databases might be split or combined in accordance with any of the embodiments described herein. In some embodiments, an external database may be used.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method of creating a data model from a log file, the method comprising:
   receiving an unstructured log file comprising nested sections and hierarchies;
   determining, via a processor, metadata based on the received unstructured log file wherein the determining is based on receiving a determination of a master log entry that indicates a plurality of entries of the unstructured log file comprising a similar regular expression wherein the determination of the master log entry comprises (i) displaying, to a user, available entries from the log file that comprise the similar regular expression and (ii) receiving a selection from the user indicating which of available entries comprises the master log entry;
   receiving, from a user, a plurality of fields to be associated with a data model based on the determined master log entry;

transmitting the data model to the user wherein the data model is based on the determined metadata, the master log entry and the plurality of fields; and
saving the data model to a database.

2. The method of claim 1, wherein determining metadata based on the received log file further comprises:
receiving a determination of a log entry separator; and
receiving an indication of a field separator.

3. The method of claim 2, wherein the log entry separator comprises at least one of a new line, a time stamp, a carriage return, or a user defined indicator and the field separator comprises a space, a tab, or a comma, a character, a phrase, or user defined field separator.

4. The method of claim 1, wherein the plurality of fields comprises:
a log field name, an indication to include the log field in the data model, a log field content type, and a regular expression associated with the log field.

5. The method of claim 1, wherein the data model is saved in a JSON format.

6. The method of claim 1, wherein the data model comprises (1) a plurality of fields and their associated regular expressions, (2) a plurality of configuration parameters for each field to indicate a field relationship and a content type and (3) an indicator for each field to indicate if the field contains information that should be extracted into a structured dataset.

7. The method of claim 1, further comprising:
parsing the received unstructured log file to determine regular expressions; and
storing the determined regular expressions in a regular expression library.

8. The method of claim 1, further comprising:
scanning the received unstructured log file;
determining if a same type of log file has been modeled based on a file extension associated with the received unstructured log file; and
in case that the same type of log file has been modeled, displaying an existing model to the user in response to the user attempting to model the received unstructured log file.

9. The method of claim 1, wherein receiving a plurality of fields comprises passing an indication of the determined master log entry and a line field delimiter to a log modeling engine to transmit the plurality of fields.

10. A non-transitory computer-readable medium comprising instructions that when executed by a processor perform a method creating a data model from a log file, the method comprising:
receiving an unstructured log file comprising nested sections and hierarchies;
determining, via a processor, metadata based on the received unstructured log file wherein the determining is based on receiving a determination of a master log entry that indicates a plurality of entries of the unstructured log file comprising a similar regular expression wherein the determination of the master log entry comprises (i) displaying, to a user, available entries from the log file that comprise the similar regular expression and (ii) receiving a selection from the user indicating which of available entries comprises the master log entry;
receiving, from a user, a plurality of fields to be associated with a data model based on the determined master log entry;
transmitting the data model to the user wherein the data model is based on the determined metadata, the master log entry and the plurality of fields; and
saving the data model to a database.

11. The medium of claim 10, wherein determining metadata based on the received log file comprises:
receiving a determination of a log entry separator; and
receiving an indication of a field separator.

12. The medium of claim 11, wherein the log entry separator comprises at least one of a new line, a time stamp, a carriage return or a user defined indicator.

13. The medium of claim 11, wherein the field separator comprises a space, a tab, a comma, a character, a phrase, or a user defined field separator.

14. The medium of claim 10, wherein the plurality of fields comprises:
a log field name, an indication to include the log field in the data model, a log field content type, and a regular expression associated with the log field.

15. The medium of claim 10, wherein the data model is saved in a JSON format.

16. An apparatus comprising:
a processor; and
a non-transitory computer-readable medium comprising instructions that when executed by a processor perform a method creating a data model from a log file, the method comprising:
receiving an unstructured log file comprising nested sections and hierarchies;
determining, via the processor, metadata based on the received unstructured log file wherein the determining is based on receiving a determination of a master log entry that indicates a plurality of entries of the unstructured log file comprising a similar regular expression wherein the determination of the master log entry comprises (i) displaying, to a user, available entries from the log file that comprise the similar regular expression and (ii) receiving a selection from the user indicating which of available entries comprises the master log entry;
receiving, from a user, a plurality of fields to be associated with a data model based on the determined master log entry;
transmitting the data model to the user wherein the data model is based on the determined metadata, the master log entry and the plurality of fields; and
saving the data model to a database.

17. The apparatus of claim 16, wherein determining metadata based on the received log file comprises:
receiving a determination of a log entry separator; and
receiving an indication of a field separator.

18. The apparatus of claim 17, wherein the log entry separator comprises at least one of a new line, a time stamp, or a carriage return and the field separator comprises a space, a tab, or a comma.

19. The apparatus of claim 16, wherein the plurality of fields comprises:
a log field name, an indication to include the log field in the data model, a log field content type, and a regular expression associated with the log field.

20. The apparatus of claim 16, wherein the data model is saved in a JSON, XML or Modeling Markup language format.

* * * * *